May 9, 1939.    R. LAPSLEY    2,157,903
TORSION TESTING MACHINE
Filed Feb. 15, 1936    8 Sheets-Sheet 5

Fig. 5.

Inventor:
Robert Lapsley,
By Brown, Jackson, Boettcher & Dienner
attys

May 9, 1939.  R. LAPSLEY  2,157,903
TORSION TESTING MACHINE
Filed Feb. 15, 1936    8 Sheets-Sheet 7

Inventor:
Robert Lapsley,

Patented May 9, 1939

2,157,903

UNITED STATES PATENT OFFICE 2,157,903

TORSION TESTING MACHINE

Robert Lapsley, Berrien Springs, Mich., assignor to Clark Equipment Company, Buchanan, Mich., a corporation of Michigan Application February 15, 1936, Serial No. 64,035

23 Claims. (Cl. 73—51)

The present invention relates generally to testing machines and the like and is particularly concerned with the provision of new and improved means for testing one or more operating units, or one or more sets of them, under full speed and full load conditions.

The primary object of the present invention is the provision of a torsion testing machine capable of being adjusted to maintain a predetermined loading and operable throughout the test without substantial variation in the predetermined loading.

Another object of the present invention is the provision of an improved testing machine which is adapted to suitably receive and support different kinds of units to be tested, and particularly is it an object of the present invention to provide a compact machine which is enabled to test full sized units either in one or more pairs, and it is a further object of the present invention to provide a testing machine that is so constructed and arranged that the disposition of one or more full size units will not cause any interference with any of the operating parts of the machine.

Machines have been provided heretofore for testing units under full speed and load conditions and, in general, such machines include two lines of shafting geared together at their opposite ends to rotate simultaneously and driven by any suitable means. The unit or units to be tested may be interposed in either or both of the lines of shafting, and in order to subject the unit or units being tested to conditions simulating operation under full load, the interconnected lines of shafting were placed under torsion by means of a torque coupling which acts through one line of shafting and reacts against the other line of shafting, in which the unit to be tested is disposed, so as to impart a torsion load on the latter equivalent to the load to which the unit is normally subjected in actual service. By then driving the unit and the interconnected shafting, including the torsion coupling itself, the unit subjected to the torsion load is driven at its rate of normal operation. However, it has heretofore been difficult to install and adjust the torque coupling so as to introduce an ascertainable and predetermined amount of torque into the system or to determine whether or not such torque was retained during the test. Also, no one of the prior machines was adapted or arranged to receive different kinds of units to be tested, such as transmissions, rear axles, differentials, gear boxes, and other automotive units.

A further object of the present invention, therefore, is the provision of new and improved means for impressing a measured torque load upon any one or more of different kinds of units to be tested, in connection with means for rotating the unit or units at its rated or normal speed of operation. A further object of the present invention is the provision of new and improved gear connections for use in such a machine and providing an arrangement in which one line of shafting is at a higher plane or level than the other, thereby accommodating units of various sizes and character. A still further object of the present invention is the provision of an improved torque coupling for impressing the desired torque upon the unit or units to be tested, and still further another object of the present invention is the provision of a new and improved method for measuring the torque impressed and periodically ascertaining the amount of wear occurring in the unit or units being tested and whether or not the desired torque is being retained during the test. A still further object of the present invention is the provision of a testing machine provided with new and improved means for measuring the torque reaction in the unit or units being tested.

These and other objects and advantages of the present invention will be apparent to those skilled in the art after a consideration of the following detailed description of the preferred embodiment, taken in conjunction with the accompanying drawings illustrating such embodiment.

Referring now to the drawings, the reference numeral 10 indicates the base or framework of the testing machine, the base preferably consisting of four I-beams 11, 12, 13 and 14 preferably resting directly upon the floor, but if desired they may be supported on legs, a foundation or pedestal of any suitable character, or in any manner desired. The base members 11, 12, 13 and 14 are preferably connected together at one end by cross bars 17 and 18, which also serve as a support for a constant speed motor 20. The base members are also connected together by two base plates or tables 23 and 24 suitably bolted or otherwise secured to the base members. If desired, the base members 11 to 14 may be provided with a plurality of openings to accommodate the cross bars and supporting plates in various positions. For testing elongated units, such as the rear axles of automotive vehicles and similar units, the base or frame 10 may be augmented by an auxiliary platform indicated in Figure 5 in its entirety by the reference numeral 25 and which will be referred to later. The auxiliary platform 25 preferably consists of a pair of I-beams 26 and 27 disposed transversely of the base members 11, 12, and 13 and 14 connected at their ends and supported by end pieces preferably in the form of I-beams 28 and 29. If desired, provision may be made for bolting or otherwise securing the cross members 26 and 27 to one or more of the base members of the frame 10. Generally the I-beams 28 and 29 rest directly on the floor.

A drive gear assembly, indicated in its entirety by the reference numeral 35, is mounted on the forward or motor end of the base members, being suitably secured to the forward supporting plate 23, and at the rear end of the frame 10 of the testing machine a transfer gear assembly, indicated in its entirety by the reference numeral 36, is provided and is supported on the rear plate member 24. In the preferred construction, the supporting plates 23 and 24 are formed as integral parts, such as flanges, of the casings of the drive and transfer gear assemblies, but they may be separate if desired.

Figure 2:
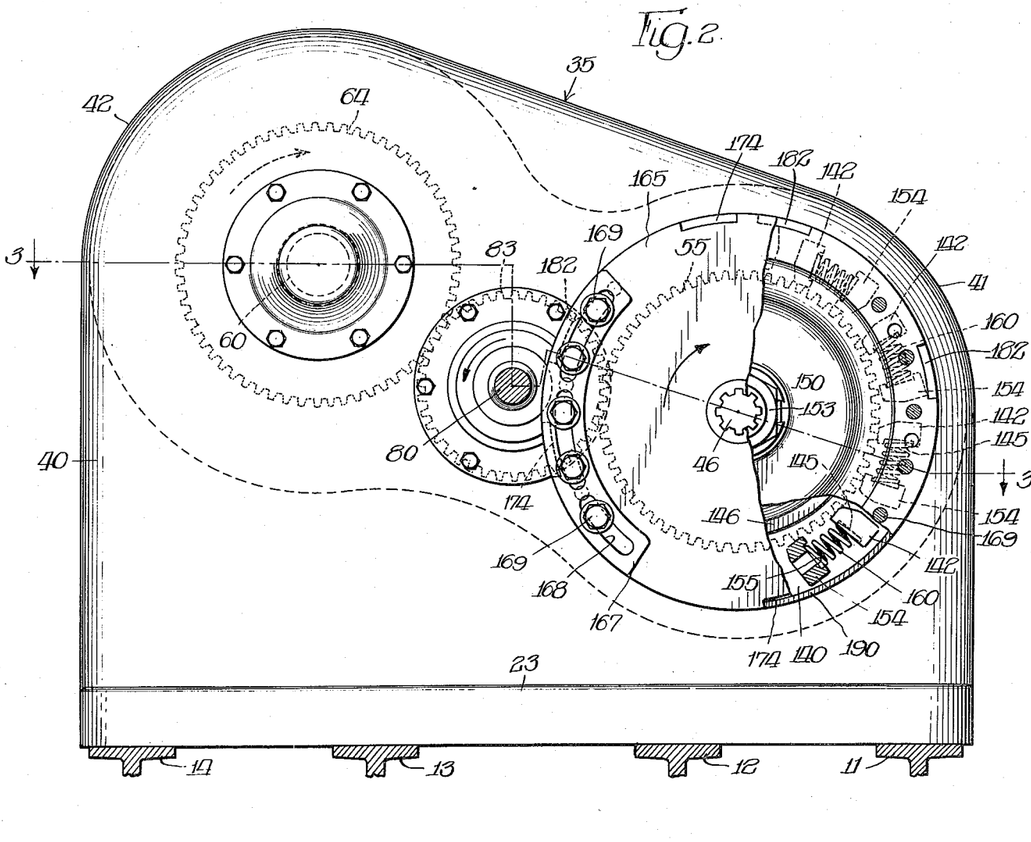
Figure 2 is an enlarged view taken along the line 2—2 of Figure 1 and looking in the direction of the arrows, showing the connecting or drive gear unit in elevation and the torque coupling with parts broken away.
Figure 3:
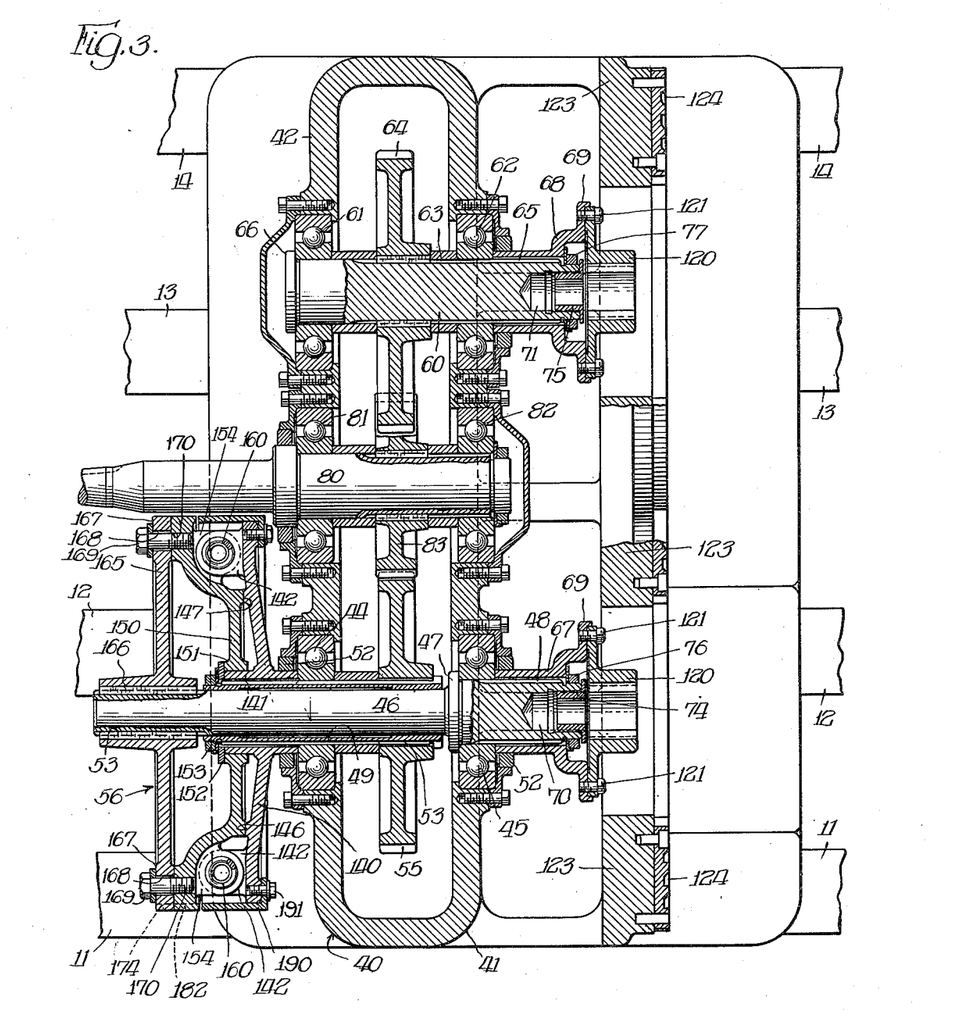
Figure 3 is an enlarged sectional view taken substantially along the line 3—3 of Figure 2 through the torque and drive gear units at the motor end of the machine.

The drive gear assembly or unit is best shown in Figures 2 and 3 and comprises a gear case 40 of generally rectangular section and including a relatively low end 41 and a relatively high end 42 (Figure 2). The gear case 40 at the low end 41 thereof is provided with suitable bearing means 44 and 45 (Figure 3) in the opposite side walls thereof. A shaft 46 having a collar 47 and its rear end splined, as indicated at 48, is supported by the bearings 45 and by a tubular sleeve member 49 which surrounds the intermediate portion of the shaft 46 and carries the inner race of the other bearing means 44. The bearings 44 and 45 are each provided with suitable lubricant retaining means 52, and the sleeve 49 is provided with exterior splines 53, which receive a gear 55. A suitable torque coupling 56, which will be described later, is provided for connecting the outer ends of the shaft 46 and sleeve 49 together.

At the high end 42 (Figure 2) of the gear case 40, a short shaft 60 is supported in the side walls of the gear case by suitable bearing means 61 and 62. The shaft 60 is splined as indicated at 63 and receives a gear member 64 which is mounted upon the splined section 63 of the shaft in non-rotatable manner, as is the gear 55 on the inner end of the sleeve 49. The forward end of the shaft carries a collar 66, in a manner similar to the shaft 46, and the splined rear ends of the shafts 46 and 60 receive coupling sleeves 67 and 68, respectively, each of which is provided with a radially outwardly extending flange 69. The rear end of each of the shafts 46 and 60 is recessed, as at 70 and 71, and these reduced ends receive pilot bushings 74 and 75 which, in turn, receive and support the forward ends of the two lines of interconnecting shafting. Nuts 76 and 77 are screwed onto the reduced threaded ends of the shafts 46 and 60 and co-operate with the collars 47 and 66 to hold associated bearing means in the proper position.

A drive shaft 80 is journaled for rotation in the intermediate portion of the gear case 40 on bearings 81 and 82 supported in the side walls of the gear case, and a driving pinion 83 meshes with both of the gears 55 and 64 and is keyed or otherwise securely fixed to the shaft 80. The latter extends forwardly, and receives a double universal joint 85 (Figure 1) which is connected with the motor 20 by a short shaft 86.

Figure 1:
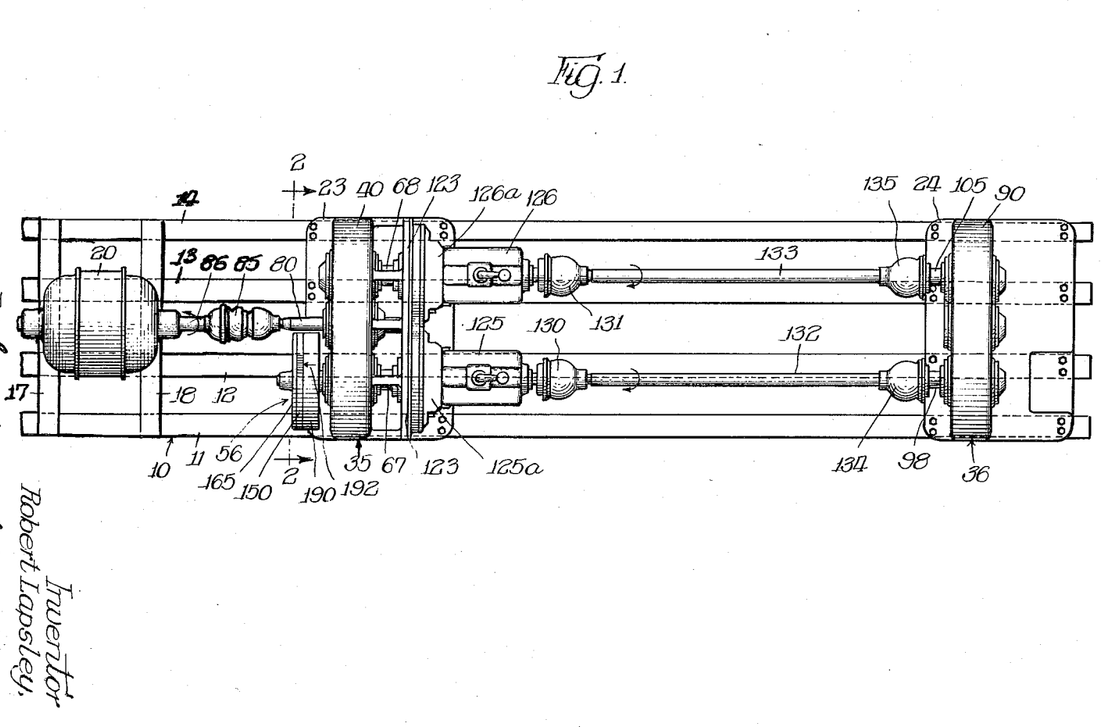
Figure 1 is a plan view of a testing machine embodying the principles of the present invention and arranged for testing a pair of automotive transmissions.
Figure 4:
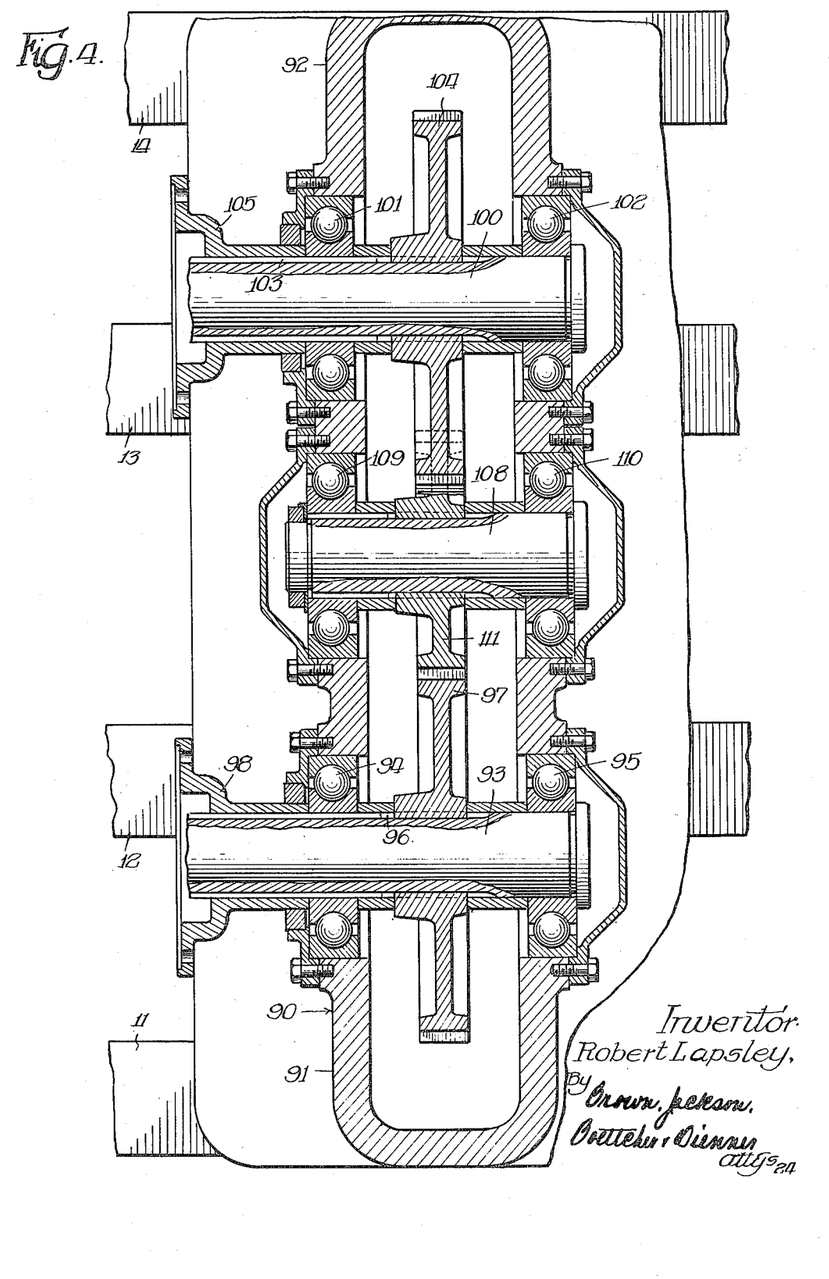
Figure 4 is a horizontal section taken through the transfer gear unit at the rear end of the machine opposite the units shown in Figures 2 and 3.

The transfer gear assembly or unit 36 at the rear end of the machine is substantially the same construction as described above for the driving gear assembly. Referring now to Figures 1 and 4, it will be seen that the transfer gear assembly 36 includes a gear case 90 having a low end 91 and a high end 92, like the gear case 40 described above. A short shaft 93 is journaled on bearings 94 and 95 in the end 91 of the gear case and has splines 96 on which a gear 97 on the inside of the gear case 90 and a coupling sleeve 98 on the outside of the gear case 90 are mounted. Similarly, a shaft 100 is journaled on bearings 101 and 102 in the other end of the housing 90 and is splined, as at 103, and supports a gear 104 on the inside of the casing 90 and a coupling sleeve 105 on the outside thereof, the coupling sleeves 98 and 105 being at the forward side of the gear case 90. A central shaft 108 is mounted in the side walls of the gear case 90 by bearings 109 and 110 and is splined or otherwise formed to receive and have fixed thereto a pinion 111 which meshes with both of the gears 97 and 104.

When the unit to be tested is an automobile or truck transmission, each of the forward shafts 46 and 60 (Figure 3) carries a splined driver 120 secured in any manner desired, as by bolts 121, to the flanges of the coupling sleeves 67 and 68 associated therewith. An adapted bracket 123 is mounted or carried on the forward drive gear unit 35 and is provided with any suitable means for receiving the transmission or transmissions to be tested. Preferably the bracket carries pilot plates having or is itself formed with annular recesses 124 (Figure 3) to receive the forward edges of the bell or clutch housings 125a and 126a (Figure 1) of the transmissions 125 and 126, whereby the latter are supported in the proper position. As best shown in Figure 1, where two transmissions are tested at the same time, one of the transmissions, indicated at 125, is mounted in line with the lower shaft 46 and has its driving shaft connected therewith through the sleeve 67 and the splined driver 120, the other transmission 126 being connected with the shaft 60 in a similar manner. The rear ends of the driven shafts of the transmissions 125 and 126 are operatively connected with the collars 98 and 105 of the shafts 93 and 100 in the transfer gear case at the rear end of the machine through universal joints 130 and 131 (Figure 1) and coupling shafts 132 and 133, and the latter are connected to the collars 98 and 105 through rear universal joints 134 and 135.

It is to be noted that the gears in the drive gear assembly and the transfer gear assembly are so arranged that the lines of shafting rotate in the same direction, and since the two gears at each end of each of the drive gear and transverse gear housings are the same size the lines of shafting rotate at the same speed, but this is not necessary.

The torque or torsion coupling 56, mentioned above, is best shown in Figures 2 and 3 and comprises a disc member 140 having a hub section 141 keyed, splined or otherwise secured in permanent fashion to the outer end of the sleeve 49 and provided with a peripheral series of axially directed lugs 142, each having a spring receiving recess 145 formed therein. The radial portion of the disc member 140 is also provided with a planar bearing surface 146 (Figure 3) which receives a similarly formed bearing surface 147 on a second coupling disc member 150 having a hub section 151 mounted for rotation on the hub 141 of the disc member 140. The disc member 150 is held in place by a washer 152 and a nut 153 threaded onto the outer end of the driving sleeve 49, and the peripheral portion of the member 150 is provided with a peripheral series of axially directed lugs 154 extending in opposite direction with respect to the lugs 142 on the first disc member 140. The lugs 154 are similarly provided, however, with spring receiving recesses 155. Spring means in the form of a plurality of compression springs 160, which are long and flexible and have a low rate of compression to insure minimum variation in operation, are seated in the spring receiving recesses 145 and 155 and, when stressed, are adapted to exert torque between the members 140 and 150 for introducing torsion into the interconnected lines of shafting.

An adjusting coupling disc 165 is keyed, as at 166, onto the outer end of the shaft 46 and is constructed with a pair of peripheral bosses 167 having a plurality of slots 168 (Figure 2) which receive a plurality of clamping bolts or cap screws 169 threaded into corresponding openings 170 (Figure 3) formed about the periphery of the coupling disc member 150. As best indicated in Figure 2, the lengths of the slots 168 equals or is slightly in excess of the spacing between the bolt holes 170 in the disc member 150 so that in any position of adjustment of the member 165 with respect to the member 150, at least half of the clamping cap screws 169 can be drawn up tight to permanently fix the coupling disc member 165 with the member 150 with the springs 160 under torque creating compression therebetween.

Figures 6, 12:
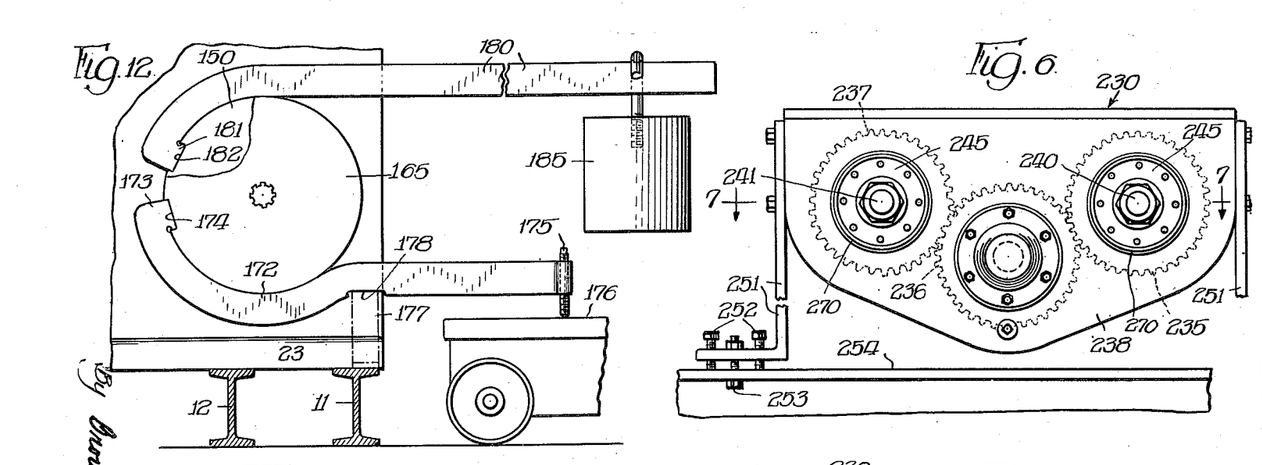
Figure 6 is a side elevation of one of the gear units connecting adjacent ends of the axle shafts.
Figure 12 illustrates the manner of setting the torque unit so that it exerts a predetermined amount of torque.

The torque coupling springs 160 are placed under compression in the following manner. Referring now to Figure 12, a tool 172 is provided with a hook end 173 which engages in one of a plurality of recesess 174 or notches formed in the coupling disc 165 along the edge thereof, as best shown in Figure 2. The tool 172 is curved so as to embrace a portion of the disc member 165 and extends laterally outwardly thereof in the form of and serves as a scale bar having at its outer end an adjusting bolt 175 which is arranged to rest upon the platform of force measuring means in the form of a platform scale 176 of conventional construction and keeps the disc 165 from turning. In order that the scale bar 172 shall form a lever arm of definite and ascertainable length, a gauge block 177 may be disposed between the upper surface of the outermost base member 11 and a milled surface 178 formed on the scale bar 172 for the purpose of disposing the contact end of the adjusting bolt 175 a definite distance from the vertical plane of the axis of the torque coupling members 150 and 165. A second tool in the form of a weight bar 180 having a hook end 181 adapted to engage one of a plurality of notches 182 (Figure 3) formed in the coupling member 150. The hook end of the bar 180 is formed to partially embrace the coupling member 150 and is extended laterally in generally parallel relation with respect to the scale bar 170. A weight 185 is adapted to be carried upon the weight bar 180 in various positions to impose various amounts of force on the springs 160.

In initially setting the torque coupling so as to exert a measured amount of torque and introduce the same into the system of interconnected lines of shafting to thereby subject the unit or units being tested to a certain amount of pre-loading, the platform scale 176 or the like is moved into position underneath the outer end of the scale bar 170, and with the latter in a true horizontal position, which may be checked by the use of the gauge 177, the bolt 175 is adjusted to engage the scale bar of the platform scale in horizontal position when balanced at zero. Next, the amount of tension or torque it is desired to impose on the unit or units to be tested is set up on the platform scales, and then the weight bar 180 is applied to the member 140 and the weight 185 hung thereon and moved back and forth until the platform scale is balanced. This measures the amount of reaction which the compression springs 160 are enabled to exert in the relative positions of the coupling disc members 150 and 165 to which they have been moved under the effect of the weight 185 and the reaction against the platform scales.

The effect of this arrangement is for the weight to rotate the member 150, tending to compress the springs 160, and the latter react against the member 140 carried by the sleeve 49. From this point the torque reaction is transmitted back through the gear 55, the pinion 83, the gear 64, the line of shafting 133 (including any unit or units therein to be tested), the gear 104, the pinion 111, the gear 97, the line of shafting 132 (including any unit or units therein to be tested), back to the shaft 46 and the member 165 which is held against rotation by the scale bar 172. Thus, not only is all slack taken up between the gear teeth and other parts, but a definite ascertainable torque loading imposed on the system. Furthermore, the unit or units, such as the transmission 126, in the first line of shafting will be loaded as in driving, while the other unit or units, such as the other transmission 125, will be tested as in coasting against the engine compression. While this loading is being maintained, the clamping bolts 169, securing the adjusting disc 165 to the coupling member 150, are firmly tightened so as to secure these parts together. This establishes a rigid connection between the coupling member 150 and the shaft 46 and gear 55 fixed thereto so that if now the weight 185 is removed, together with the bars 170 and 180, the pre-loading of the springs 160 will be retained.

After the torque coupling has been adjusted in the manner just stated, a cap in the form of an index cap 190 is fastened in position, as by cap screws 191. The index cap 190 carries a graduation mark 192 (Figure 1) which, upon rotation of the cap 190 with respect to member 150, comes opposite one or more graduation marks on the peripheral edge of the coupling member 150. The index cap is set with its zero mark opposite the zero mark on the coupling member 150 and then the cap screws 190 are tightened. Not only does the cap 190 then serve as an index member but, in addition, it embraces the springs 160 and prevents portions of any of them from flying outwardly in the event that one or more of them fail in operation while the torque coupling member is rapidly rotating.

The motor 20 is preferably of a constant speed type so as to maintain the transmissions 125 and 126 under rotation at a constant rate, and the effect of the torque coupling, as described above, is to introduce a measured amount of torque or spring pre-loading into the units being tested. Thus, the units are rotated under conditions practically the same as in actual service. As the test continues and the units wear, a certain slack develops in them which is taken up by the springs 160 and which become manifest by a relative movement between the coupling members 140 and 150. If the index 190 is carried by the latter and is disposed adjacent graduations formed on the former, this furnishes a convenient means by which the condition of the units on the test can be checked. However, since the springs 160 acting to take up the slack are relatively long and flexible, their effect in subjecting the units to impressed torque is not greatly reduced. The relative movement that does occur is indicated by a shift of the index mark relative to the associated graduations. In actual operation I prefer to continue the test, periodically stopping the rotation of the parts thereof in order to take a reading, until a limited amount of wear or slack has occurred, as indicated by a relative movement between the coupling members 140 and 150. When this limited amount is indicated by the index, the weight and scale bars are again applied and the platform scales and scale bar associated therewith in the manner set forth above. The cap screws 169 are then loosened to permit a tightening of the parts and to introduce into the system the desired amount of definite and ascertainable torque. The cap screws 169 are then tightened again, the index cap 190 set to zero and the test continued in the same manner. In this way, I am enabled to maintain substantially the same loading throughout the life test. Usually only two or three resettings are required.

Various revolution counters, indicating and recording instruments and the like may be associated with the testing machine in the usual manner and as desired. It is preferable of course, that the two transmission units 125 and 126 be of identical construction so far as available gear ratios are concerned, and since the lines of shafting in which they are interposed rotate in the same direction both transmissions are subjected to the same test loading and conditions, except that one s tested as in driving and the other as in coasting or in reverse. Any gear ratio of the transmissions may be tested, and in order to change from one to another it is necessary to stop the motor, release the torque, and shift the gears and then reset the torque. In the construction illustrated it is also necessary that each of the transmissions shall be in the same gear ratio since both lines of shafting rotate at the same speed. The shafts 132 and 133 are splined for longitudinal extension, and may be adjusted to any desired length.

Figure 5:
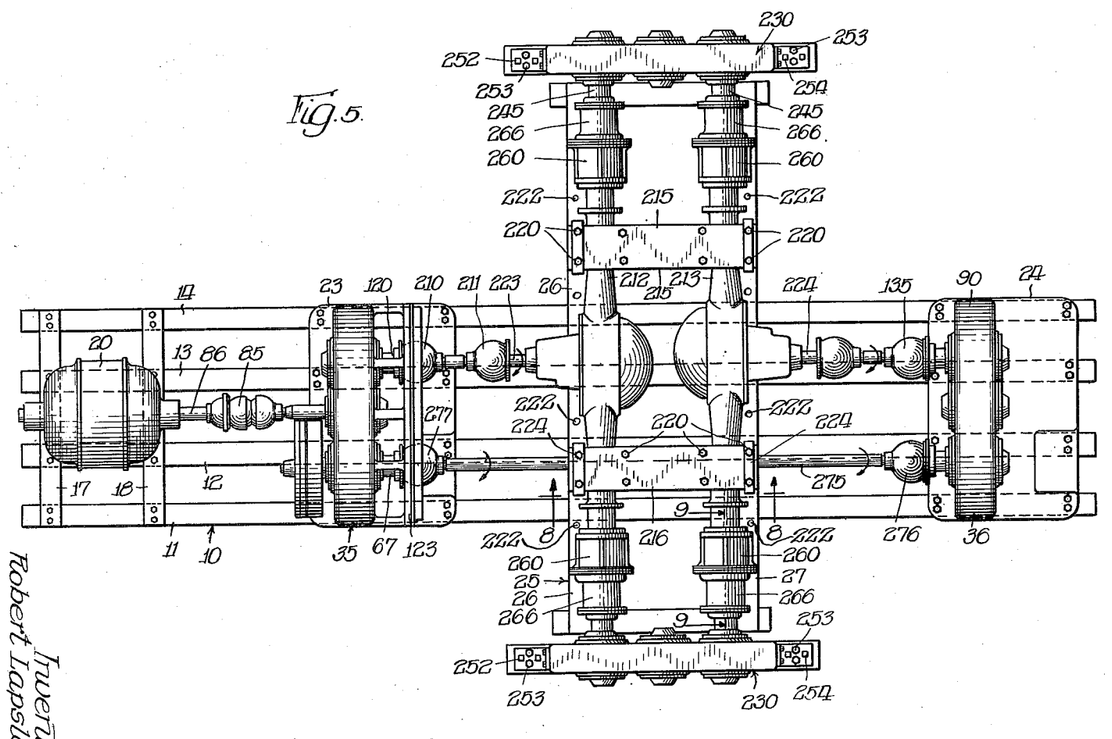
Figure 5 is a plan view of the testing machine when arranged for the testing of a pair of automotive axles.
Figure 8:
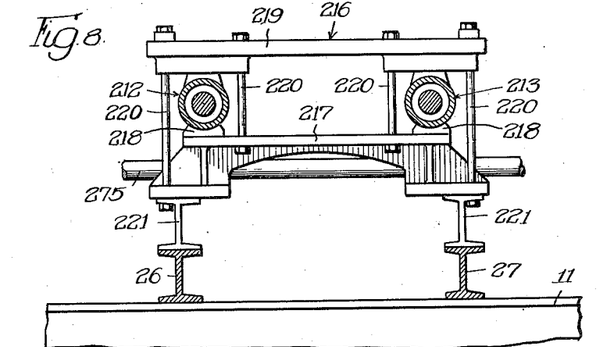
Figure 8 is a section taken along the line 8—8 of Figure 5.

Reference was made above to the fact that units other than transmissions can be tested by the above described machine. For example, the testing of two rear axle units is illustrated in Figure 5. In this case, both of the axles are interposed in the elevated line of shafting, connecting the splined driver 120 at the driving gear assembly with the rear universal joint 135. Preferably, the splined driver 120 is connected with a pair of universal joints 210 and 211, and the two rear axles to be tested, indicated by the reference numerals 212 and 213, are mounted in suitable adapter brackets or standards 215 and 216, best shown in Figure 8 and each including a casting or base 217 with axle receiving cradles 218 and a clamping plate 219 fastened by long bolts 220 and bearing against the usual axle pads on the axle housings. Preferably, the base castings 217 are mounted on the cross beams 26 and 27 by short I-beam sections 221 bolted thereto. For this purpose, these bars are provided with a plurality of sets of bolt holes 222 for the purpose of receiving the standards 215 and 216 in any one of a plurality of positions. As illustrated in Figure 5, the axles 212 and 213 are arranged with their propeller shaft sections, indicated at 223 and 224, in axial alignment and constituting, in effect, a part of the line of shafting from the drive gear assembly 35 to the transverse gear assembly 36. Suitable riser blocks, shims, and the like may be provided for bringing the axles 212 and 213 to the proper level and in line with the shafts 60 (Figure 2) and 100 (Figure 4) of the driving gear and transfer gear units 35 and 36.

Figure 7:
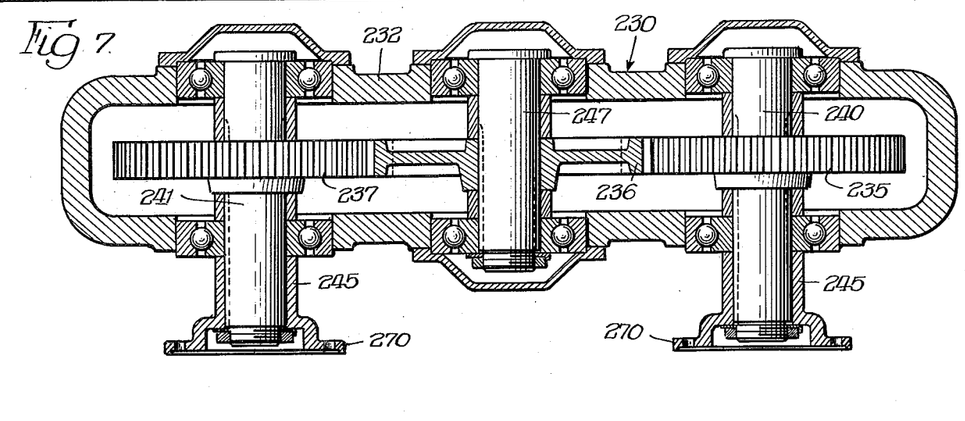
Figure 7 is an enlarged section taken along the line 7—7 of Figure 6.

For transmitting the drive from one rear axle to the other, I provide a pair of axle-to-axle gear assemblies or units indicated in Figures 5, 6 and 7 by the reference numeral 230. Preferably, these units are identical, and each comprises a housing 232 serving as a support for a train of three gears 235, 236 and 237, the end gears 235 and 237 being substantially the same and the third gear 236 being disposed therebetween. The end gears are mounted, respectively, on shafts 240 and 241 journaled for rotation in the housing 232 by suitable anti-friction means. Each of the shafts 240 and 241 extends at one end outside of the housing 232 and is splined or otherwise formed to fixedly receive a coupling sleeve 245. The idler gear 236 is mounted on a shaft 247 carried on anti-friction bearings in the side walls of the axle transfer housing 232.

The two axle-to-axle gear assemblies or units 230 are identical and hence a description of one suffices. The units are mounted, as best shown in Figures 5 and 6, upon a pair of uprights 251 having laterally bent sections carrying a pair of set screws 252 and a pair of bolts 253 arranged to serve as means for adjusting and fixing the effective height of the uprights with respect to a supporting beam 254.

Figure 9:
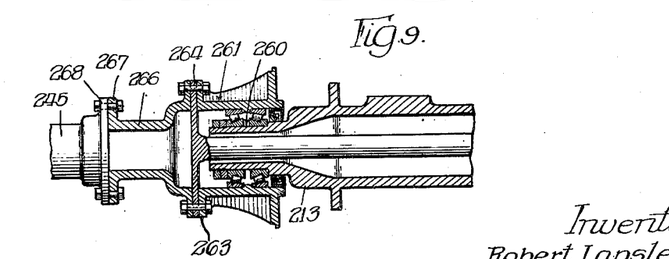
Figure 9 is a section taken along the line 9—9 of Figure 5.

The shaft sections 240 and 241 of each of the axle-to-axle gear units 230 are connected to the end of the associated axle shafts in the manner best shown in Figures 5 and 9. The ends of the axle housings are swaged down, as at 260, to form bearing seats for the wheel hubs in practically all commercial axles. While I may use any form of connection between the units 230 and the axle shafts and my invention is applicable to any type of axle, for purposes of illustration I show the use of hub members 261 which are rotatably mounted thereon. Each of the hubs 261 has a flange 263 that is bolted to the driving flange 264 on the associated axle shaft and to the flange of a sleeve member 266, and the latter has a flange 267 that is bolted to the flange 268 of the associated coupling member. When the axles 212 and 213 and units 230 are arranged in the manner shown in Figure 5, the axles are arranged for a drive side test; that is, the axles are arranged to be stressed in the manner they are stressed when driving a vehicle. However, since one axle drives the other in back to back relation, they are in effect rotated in opposite directions. The torque coupling 56 is set up to impose a measured amount of torque or pre-loading on the axle units and the motor 20 operated in the manner described above.

The axles 212 and 213, in this test, are preferably associated in the higher line of shafting, while the lower line of shafting takes the form of a torsion return shaft 275 connected at its rear end to a universal joint 276 with the shaft 93 (Figure 4) at the lower end of the rear transfer gear assembly 36 and at its forward end through a universal joint 277 with the splined coupling member 67 (Figure 2) and the associated shaft 46 at the lower end of the driving gear assembly 35.

When both of the axle-to-axle transfer gear assemblies 230 are installed, as indicated in Figure 5, both axle shafts in each axle are rotated in the same direction and at the same speed. Thus, the differential in each axle merely turns over but is not called upon to equalize the torque between two differently rotating shafts. If it is desired to test the differential parts themselves, the outer ends of one axle shaft at each rear axle will be rigidly connected together and held against rotation by any suitable means, and then only one axle-to-axle gear transfer assembly will be employed for the ends of the other axle shafts. With the parts arranged in this manner, during the test one axle shaft in each rear axle will be held stationary while the other axle shafts will be rotated at twice their normal speed. Differential action can also be tested by using a different number of teeth in gears 237 and 235 of the axle-to-axle drives, whereby the axle shafts on one side are required to rotate faster than the axle shafts on the other side thereby causing slight differential action.

The rear axles 212 and 213 may be subjected to a coast-side test by interposing the axles in the lower line of shafting connecting the shafts 46 and 93. To set up the machine for this test, the torsion return shaft 255 is placed at the other side of the machine and the adapter brackets 215 and 216 moved to the other side of the machine and arranged to bring the propeller shaft sections 222 and 223 in line with the shafts 46 and 93 by mounting the units 230 lower down in the uprights 251 and lowering the cradles 218, as by omitting the beam sections 221. When the propeller shaft units 223 and 224 are connected with the shafts 46 and 93 and the torque coupling properly adjusted the rear axles 212 and 213 may be given a test in which the stresses are applied to both of the axles to stress them in a direction opposite to that in which they are stressed when arranged in the other line of shafting.

It is to be noted that when the rear axles 212 and 213 are given a drive side test, the torsion return shaft 275 passes under and clears the ends of the axle housings (Figure 5) by virtue of the position of this shaft below the level of the other line of shafting. Similarly, when the rear axles are arranged at the other side of the machine, the return shaft 275 connecting the shafts 60 and 100 passes over the ends of the axle housings. In this same manner, elongated units other than rear axles may be tested.

Figure 10:
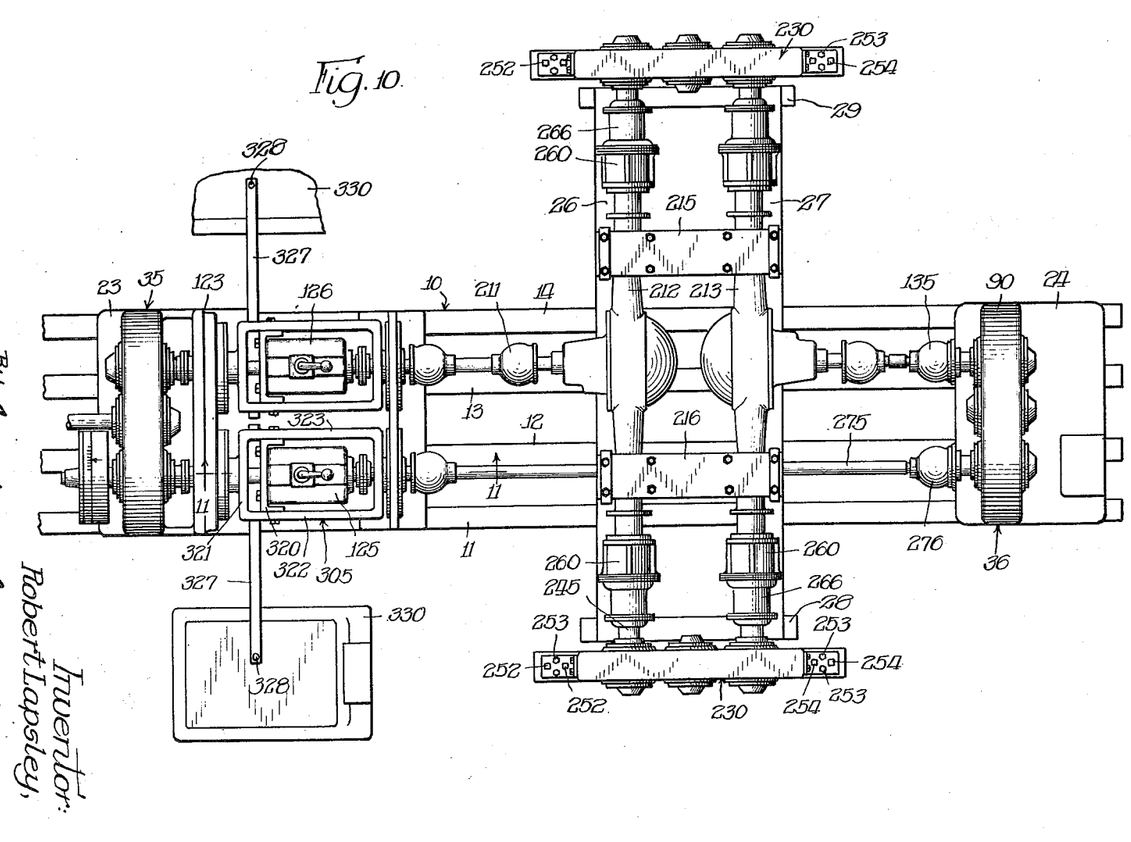
Figure 10 is a plan of the machine arranged for simultaneous testing of two pairs of units, with measuring means for determining the torque transmitted by two of the units.
Figure 11:
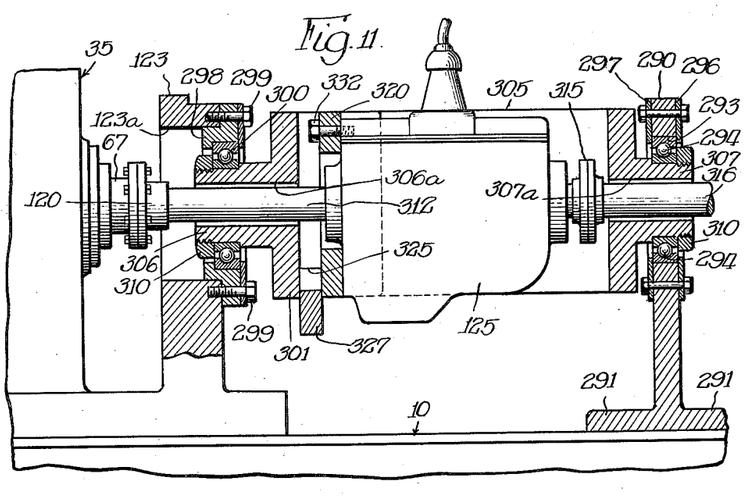
Figure 11 is a vertical section taken substantially along the line 11—11 of Figure 10.

In Figures 10 and 11 I have shown how the testing machine can be arranged to test two transmissions and two rear axles at the same time. Referring now to these figures, and more particularly to Figure 10, the motor 20 and its support is moved further forwardly on the base 10, and the same is true of the drive gear case 35 and torsion coupling associated therewith. The rear axles in this test are disposed in substantially the same relation as illustrated in Figure 5 and described above, and hence the same reference numerals have been used. The transmissions, to accommodate which the motor and drive gear case were shifted forwardly, are indicated by the reference numerals 125 and 126, the same as described above or they may be the same type of units set forth above except that the clutch housings have been removed in order to mount the transmissions in rockable torsion cradles for the purpose of determining the reaction torque in each of the transmissions under test. The mounting of the transmissions will now be described.

Referring now more particularly to Figure 11, the transmission 125 will be taken as typical, both transmissions 125 and 126 being mounted in exactly the same manner. An additional supporting bracket 290 having a flanged base 291 is mounted on the base beams rearwardly of the drive case gear unit 35 and has a central opening 293 in which bearing means 294 is disposed, being held in place by plates 296 and 297 bolted to opposite sides of the standard 290. The bracket 123 has an enlarged opening 123a which receives an adaptor block 298 fastened thereto by bolts 299 and carrying bearing means 300 in axial alignment with the bearing means 294 carried rearwardly thereof by the standard 290.

The transmission supporting cradle 305 is in the form of a generally rectangular casing having trunnion extensions 306 and 307 at its forward and rear ends by which the cradle is supported for rocking movement in the aligned bearings 300 and 294. These trunnion extensions are shouldered to receive the inner races of the aforesaid bearing means, and each of the trunnion extensions is threaded and receives the clamping nut 310 which properly fixes the bearing means in position. The trunnion extensions 306 and 307 are hollow to accommodate a short shaft 312 to the forward end of which is fixed the splined collar 120 bolted to the driving member 67 carried at the rear end of the shaft 46 (Figure 3). The shaft 312 is connected in a suitable manner to serve as the drive shaft for the transmission 125. The driven shaft of the latter is connected by means of a suitable flanged coupling 315 with the forward end of a short shaft 316, the rear end of which is connected with the connecting shaft 275 shown in Figure 5 and described above in connection with that figure.

The cradle member 305 is provided with a transverse wall 320 spaced rearwardly a short distance from the front wall 321 of the cradle. The side walls 322 and 323 (Figure 10) are notched, as at 325 (Figure 11) to receive a transverse scale bar 327 extending laterally outwardly from the cradle and having an adjusting bolt 328 bearing upon the plotform of a conventional weight measuring scale 330. The openings 306a and 307a of the hollow trunnions 306 and 307 are made sufficiently larger than the shafts 312 and 316 so that larger or smaller shafts may be used as test conditions require. Preferably, the intermediate wall 320 is formed as a separate part and secured in position in any suitable manner. If desired, the transverse or intermediate wall 320 may be flanged at its ends, as thus indicated in Figure 10, which may be bolted or otherwise secured to the cradle. The wall 320 has a plurality of apertures to receive bolt means 332 by which the transmission 125 is supported rigidly in position for movement with the cradle 305.

The transmission 126 at the other side of the machine is supported in exactly the same manner, and therefore it is believed that additional description is not necessary, the corresponding parts of the cradle for the transmission 126 being indicated by the same reference numerals.

The machine shown in Figure 10, with the cradle mounted transmissions and the rear axles, is set up for test in the manner described above in connection with Figures 1 and 5. However, in Figure 10, since the transmissions 125 and 126 are both mounted independently of one another and for rocking movement, which movement is resisted by force measuring means, the input torque of the machine through one transmission to the rear axles is shown by the reading on one of the scales while the resisting torque is indicated on the other scale. For example, when the parts are arranged as in Figure 10, the scale associated with the transmission 126 indicates the input torque while the scale associated with the transmission 125 indicates the resisting torque exerted by the springs 160.

The difference of the readings indicates the amount of drag or resistance offered by both the transmissions and the rear axles.

While I have shown and described above the preferred form of the present invention, it is to be understood that my invention is not to be limited to the specific details shown and described above, but that, in fact, widely different means may be employed in the practice of the broader aspects of my invention in accordance with the appended claims.

What I claim, therefore, and desire to secure by Letters Patent is:

1. In a testing machine, a transmission line adapted to contain the unit to be tested between the ends thereof, means geared to the opposite ends of said transmission line, said means including springs for pre-loading said unit while providing for the rotation thereof, means including two relatively movable parts for introducing a determined amount of torsion through said springs into said line, and means for fixing said parts in position relative to one another so as to maintain the torsion exerted through said springs.

2. In a testing machine, a power transmission line including axially aligned shafting and adapted to contain the unit to be tested, a second power transmission line including aligned shafting connected at its ends by gearing to rotate with said first line and connected therewith on opposite sides of the input and output ends of said unit, means for introducing a predetermined torsion in said second line to subject said unit to an initial loading, means for driving said interconnected transmission lines and said unit under said loading, said torsion introducing means comprising a pair of relatively rotatable members, one connected with the output end of said unit and the other connected with the input end, and spring means acting between said members, and means for measuring the relative movement between said members under the influence of said spring means.

3. In a testing machine, a pair of axially aligned shafts, the adjacent ends of said shafts being adapted to be connected with a unit to be tested, a gear member fixed to the outer end of each of said shafts, a second shaft means disposed in parallel relation with respect to said first shafts, a gear fixed to one end of said shaft means and operatively connected with one of said gear members, a sleeve member journaled for rotation with respect to said shaft means adjacent the other end thereof, a gear member fixed to one end of said sleeve and operatively connected with the other of said first mentioned gears, a torque coupling operatively connecting said other end of said shaft means and the other end of said sleeve and adapted to impose torsion stresses on said unit, and means for driving said unit and all of said gears while the unit is subjected to said torsion.

4. In a testing machine, a base adapted to support the unit to be tested, a pair of axially aligned shafts journaled for rotation on said base and arranged to be connected at their adjacent ends with said unit, a gear fixed to the outer end of each of said shafts, a third shaft disposed in parallelism with said first shafts and journaled for rotation on said base below the level of said first shafts so as to clear the unit connected between the latter, a gear member fixed to the rear end of said third shaft and operatively connected with the gear on the rear shaft of said aligned shafts, a gear member mounted for rotation with respect to the forward end of said third shaft and operatively connected with the gear fixed on the other of said aligned shafts, a torque coupling connecting said loosely mounted gear with said third shaft and arranged to be adjusted for introducing torsion stresses into said unit, and means for driving said unit while it is subjected to said torsion stresses.

5. In a testing machine, a base having laterally extending bars for supporting one or more units to be tested, a line of shafting rotatably supported on said base and adapted to be operatively connected with the units to be tested, a return shaft maintained in parallelism with said line of shafting and operatively connected therewith at opposite sides of the units to be tested, means supporting said return shaft for rotation on said base in a position spaced vertically with respect to said base extensions so as to clear the unit supported thereon, positive gearing connecting one end of said return shaft with said line of shafting, means including a torque coupling connecting the other end of said return shaft with the other end of said line of shafting, said torque coupling being tensioned to subject the units being tested to torsion, and means for driving said units while being subjected to torsion.

6. In testing machine, a supporting base adapted to receive a means to be tested, two parallel lines of shafting disposed at different levels so that one passes below said means, the other being adapted to receive said means, a transfer gear assembly connecting said shafting at one end to cause them to rotate simultaneously, a driving gear assembly including a driving gear and two driven gears meshing therewith, means for driving said driving gear, means rigidly connecting one of said meshing gears to one of said lines of shafting, the other of said meshing gears being rotatable with respect to the other line of shafting, and torque coupling means connected between said other line of shafting and said rotatable gear so as to impose a predetermined loading on said unit while the same is driven by said driving means.

7. In a testing machine including a shaft and a gear member rotatable with respect thereto, a torque coupling connecting said gear with said shaft and comprising a tubular sleeve journaled for rotation on said shaft and fixed to said gear, a first coupling member secured to said sleeve in non-rotatable relation, a second coupling member mounted for rotation with respect to said sleeve and said first coupling member, means for exerting torque between said coupling members, and means for fixing said second coupling member to said shaft in non-rotatable relation.

8. In a testing machine including a pair of relatively movable parts adapted to have torque exerted therebetween, a torque coupling connecting said parts and including a member having a hub splined to one of said parts and including a radially outwardly disposed portion, a second coupling member mounted for movement on the hub of said first coupling member for movement relative thereto and including radially outwardly directed portions, cooperating projections carried on said portions in opposed relation, spring means seated against certain of said projections on one member and reacting against the associated projections of the other member, a third coupling member fixed to the other of said parts, and means adjustably fixing said third member and said second coupling member to determine the amount of torque initially exerted between said parts by said spring means.

9. In a testing machine, base means for supporting the unit or units to be tested, two lines of shafting, at least one being adopted to contain a unit to be tested, connecting means at the ends of said lines of shafting, one of said connecting means including a pair of relatively movable parts connected, respectively, with said lines of shafting, means for driving said units and shafting, and means for subjecting said unit or units to torque while the same is being driven, said means comprising a member connected with one of said parts, a second member fixedly connected with the other part, a third member movable with respect to said two members, spring means interposed between said first member and said third member, means carried by said second and third members providing for the application of force thereto to compress said spring means to take up slack in said units and said shafting and to impress the desired amount of torque on said units, and means for fixing said third member to said second member for retaining the torque exerted by said spring means.

10. In a testing machine, two parts adapted to be operatively connected wth opposite ends of the unit to be tested and between which torque is to be exerted, a torque coupling connected between said parts and including a disc member secured to one of said parts and carrying spring receiving means disposed adjacent the radially outer margin of said disc, a second disc member mounted for rotation with respect to said first member and having cooperating spring receiving means disposed adjacent the spring receiving means of said first disc member, said second disc member having a plurality of bolt receiving holes, and an anchoring member rigidly secured to the other of said parts and having a plurality of slots therein, each slot being of a length sufficient to embrace two of said bolt receiving openings in the second disc member, one of said disc members and said anchoring member having tool receiving means providing for the initial compression of said spring means to establish a predetermined torque between opposite ends of the unit to be tested, and attaching bolt means disposed in said slots and openings for fixing said second member in position relative to said other testing machine part.

11. A testing machine comprising a base, two generally parallel lines of shafting journaled for rotation thereon and one of them adapted to contain the unit or units to be tested, a gear assembly connecting the rear ends of said lines of shafting for rotation together, a forward gear assembly including a driving pinion and a pair of gears meshing therewith, one of said last mentioned gears being connected directly with one line of shafting and the other being rotatable with respect thereto, a torsion coupling connected between the forward end of the other line of shafting and the other of said last mentioned gears, said coupling being adapted to set up a torsional strain in said connected lines of shafting and including the unit or units to be tested, power means connected with said driving pinion for rotating both lines of shafting while under said impressed torque, and torsion measuring means interposed in each of said lines of shafting and disposed, in effect, upon opposite sides of said unit or units so as to furnish an indication of the resistance to rotation set up by the unit or units being tested.

12. A testing machine for a pair of rear axles of automobiles and the like, comprising a base, two generally parallel lines of shafting gear connected at their opposite ends for simultaneous rotation, one of said lines of shafting being interrupted and adapted to be operatively connected to the propeller shaft sections of both axles when the latter are arranged in back-to-back relation with their propeller shaft sections extending in opposite directions, a torsion coupling connecting said lines of shafting and adapted to be stressed so as to introduce torsion strains into said lines of shafting and the included pair of rear axles, a pair of axle-to-axle gear assemblies, each being connected with the adjacent ends of said rear axles and including gear means for causing said axles to rotate together, and means for driving said lines of shafting and said axles while subjected to said impressed torque.

13. In a testing machine comprising interconnected parts adapted to be driven under an initial preloading, one being a shaft and the other being a sleeve mounted for rotation relative to said shaft, a torsion preloading unit comprising a member adapted to be fixedly connected to said shaft, a second member adapted to be fixedly connected to said sleeve, a third member movable with respect to both of said first-mentioned members, spring means adapted to be biased between said third member and one of said first mentioned members, and means adjustably fixing said third member in position with respect to the other of said first-mentioned members so as to establish the desired amount of preloading on said testing machine parts.

14. A testing machine comprising two generally parallel lines of shafting, transfer gears connecting said lines at one end thereof, a transmission receiving cradle mounted for rocking movement adjacent one end of each of said lines of shafting about an axis coinciding with the associated line of shafting, a driving gear assembly connecting the opposite ends of said lines of shafting, means connected between said driving gear assembly and one line of shafting for introducing torque into the system, and means for driving one of the gears of said driving gear assembly for rotating both lines of shafting, including the transmissions disposed in said cradles.

15. In a testing machine, a line of shafting adapted to contain the unit to be tested, gears at opposite ends of said shafting, a second line of shafting disposed in generally parallel relation to said first shafting, gears at opposite ends of said second line of shafting and operatively connected with said first mentioned gears for rotation therewith, means for driving said shafting and the included unit to be tested, one of said gears being loosely mounted on the associated line of shafting, a member fixed to the end of said shafting adjacent said loosely mounted gear, and a plurality of springs biased between said member and said loosely mounted gear for subjecting the unit being tested to a predetermined amount of preloading.

16. In a testing machine, a pair of generally parallel shaft means, a sleeve member journaled for rotation with respect to one of said shaft means adjacent one end thereof, a gear member fixed to one end of said sleeve and operatively connected to the adjacent end of the other shaft means, means at the other end of each of said shaft means for connecting the latter to rotate together, one of said shaft means including two sections adapted to be connected with a unit to be tested, a torque coupling operatively connecting said sleeve member with the adjacent end of the associated shaft means so as to impose torsion stresses on said interconnected shaft means and said unit, and means for driving said unit and said shaft means while subjected to said torsion.

17. In a testing machine, a driving gear unit comprising a casing, an intermediate shaft journaled for rotation therein and extending therefrom through one side wall of said casing, end shafts journaled for rotatiton in said casing and extending therefrom at the other side thereof, a gear fixed to said intermediate shaft, a second gear fixed to one of said end shafts and meshing with said intermediate gear, a third gear mounted for rotation on the other of said end shafts, a torsion unit serving to connect said third gear with the associated end shaft, and means connected with said intermediate shaft for driving both of said end shafts and said lines of shafting.

18. In a testing machine for testing a pair of automobile rear axles and including a base, a transfer gear unit comprising a casing, an intermediate shaft carried thereby, an intermediate gear mounted on said shaft, end shafts carried by said casing for rotation with respect thereto and extending outwardly therefrom at one side, a gear fixed to each of said end shafts and meshing with the intermediate gear, said end shafts being adapted to be connected in driving relation with the axle shafts of said axles, and means for adjustably supporting the transfer gear unit on said base so as to align the end shafts thereof with said axle shafts.

19. A testing machine for automobile transmissions and the like, comprising a base, two generally parallel lines of shafting, gear units at opposite ends of said lines of shafting and connecting the latter for rotation together, at least one transmission receiving cradle mounted for rocking movement on said base, said cradle having hollow trunnions projecting outwardly from the ends thereof and the base having brackets rockably receiving said trunnions so as to dispose the latter in axial alignment with and receiving the associated line of shafting, the transmission to be tested being supported by said cradle and arranged to be interposed in said line of shafting, means at one end of one of said lines of shafting for interposing a predetermined amount of torque in said lines of shafting and said transmission, and means for driving one of said gear units.

20. In a testing machine, two parts adapted to be operatively connected with opposite ends of the unit to be tested and between which torque is to be exerted, a torque coupling connected between said parts and including a disc member secured to one of said parts and carrying spring receiving means disposed adjacent the radially outer margin of said disc, a second disc member mounted for rotation with respect to said first member and having cooperating spring receiving means disposed adjacent the spring receiving means of said first disc member, said second disc member having a plurality of bolt receiving holes and an anchoring member rigidly secured to the other of said parts and having a plurality of slots therein, and attaching bolt means disposed in said slots and openings for fixing said second member in position relative to said other testing machine part.

21. In a testing machine, two parts adapted to be operatively connected with opposite ends of the unit to be tested and between which torque is to be exerted, a torque coupling connected between said parts and including a disc member secured to one of said parts and carrying spring receiving means disposed adjacent the radially outer margin of said disc, a second disc member mounted for rotation with respect to said first member and having cooperating spring receiving means disposed adjacent the spring receiving means of said first disc member, said second disc member having a plurality of bolt receiving holes, and an anchoring member rigidly secured to the other of said parts and having a plurality of slots therein, one of said disc members and said anchoring member having tool receiving means providing for the initial compression of said spring means to establish a predetermined torque between opposite ends of the unit to be tested, and attaching bolt means disposed in said slots and openings for fixing said second member in position relative to said other testing machine part.

22. A testing machine comprising, in combination, two interconnected lines of shafting adapted to have units to be tested interposed therein and form a part thereof, means supporting at least one of said units for rocking movement, means interposed in the connections between said lines of shafting for impressing torque forces thereon, means for driving said units while subjected to said impressed torque, and force measuring means operatively connected with said rockable unit supporting means for determining the driving torque to which said units are subjected.

23. In a testing machine, a shaft having a gear thereon, a second shaft operatively connected at one end to one end of said first shaft, a sleeve member journaled for rotation with respect to said second shaft adjacent the other end of the latter, a gear member fixed to one end of said sleeve and operatively connected with said gear, and a torque coupling operatively connecting said other end of said second shaft and the other end of said sleeve.

ROBERT LAPSLEY.